US012760797B1

(12) United States Patent
Ferre et al.

(10) Patent No.: US 12,760,797 B1
(45) Date of Patent: Oct. 13, 2026

(54) UNITARY SEAL COMPRISING ATTENUATED PORTIONS FOR HIGH MATERIAL UTILIZATION

(71) Applicant: Zoox, Inc., Foster City, CA (US)

(72) Inventors: Mario Ferre, Redwood City, CA (US); Matthew Alan Forsyth, San Mateo, CA (US)

(73) Assignee: Zoox, Inc., Foster City, CA (US)

( * ) Notice: Subject to any disclaimer, the term of this patent is extended or adjusted under 35 U.S.C. 154(b) by 0 days.

(21) Appl. No.: 18/588,369

(22) Filed: Feb. 27, 2024

(51) Int. Cl.
*F16J 15/10* (2006.01)
*F16J 15/02* (2006.01)

(52) U.S. Cl.
CPC ........... *F16J 15/104* (2013.01); *F16J 15/024* (2013.01); *F16J 15/108* (2013.01)

(58) Field of Classification Search
CPC ......... F16J 15/024; F16J 15/104; F16J 15/108
USPC ......................................... 277/598, 632, 924
See application file for complete search history.

(56) References Cited

U.S. PATENT DOCUMENTS 3,438,117 A * 4/1969 Engleman .............. F16J 15/067 264/339
3,583,711 A * 6/1971 Engleman .............. F16J 15/064 277/632
5,161,808 A * 11/1992 Walters .................. F16J 15/067 403/295
5,618,047 A * 4/1997 Belter .................... F16J 15/067 277/650
5,647,255 A * 7/1997 Stone ................... G11B 25/043 29/415
5,934,681 A * 8/1999 Novak ................... F16J 15/121 277/924
7,374,221 B2 * 5/2008 McClure ................... B60R 5/04 296/37.6
8,439,366 B2 * 5/2013 Raillard ................. F16J 15/064 277/924
(Continued)

FOREIGN PATENT DOCUMENTS

FR 3067436 * 12/2018 ............. F16J 15/064

OTHER PUBLICATIONS

911Vehicle NPL, https://911vehicle.com/product/battery-box/, retrieved Aug. 4, 2025, available Mar. 21, 2023 from https://web.archive.org/web/20230321020151/https://www.911vehicle.com/product/battery-box/ (Year: 2023).*

*Primary Examiner* — Nicholas L Foster
(74) *Attorney, Agent, or Firm* — Lee & Hayes, P.C.

(57) ABSTRACT

A unitary seal comprising a plurality of attenuated portions may be cut from a sheet of material in a folded configuration, thereby maximizing an amount of the sheet that can be made into seals and minimizing wasted material of the sheet. In examples, the unitary seal may comprise four corners, a first side having three attenuated portions, and a second side opposite the first side having three attenuated portions. The plurality of attenuated portions may be associated with thinned regions of the seal that provide flexibility and behave as joints within the seal such that the seal may be unfolded after cutting and prior to installation. In some examples, individual attenuated portions may have sealing surfaces with a minimum thickness equal to about one third the thickness of a non-attenuated portion of the seal. In some instances, a minimum thickness of an attenuated portion is at least about 2.5 mm.

20 Claims, 10 Drawing Sheets

(56) References Cited

U.S. PATENT DOCUMENTS

| | | | | |
|---|---|---|---|---|
| 8,439,367 | B2 * | 5/2013 | Jeanne | F16J 15/067<br>277/924 |
| 11,867,289 | B2 * | 1/2024 | Kaiser-Krug | F16J 15/067 |
| 2002/0020570 | A1 * | 2/2002 | Hayashi | B62K 5/007<br>180/68.1 |
| 2006/0017236 | A1 * | 1/2006 | Salameh | B21D 53/20<br>277/650 |
| 2006/0108826 | A1 * | 5/2006 | McClure | B60R 5/04<br>296/100.07 |
| 2013/0049308 | A1 * | 2/2013 | Raillard | F16J 15/064<br>277/648 |
| 2013/0087359 | A1 * | 4/2013 | Leslie | H02B 1/28<br>174/50.5 |
| 2016/0161001 | A1 * | 6/2016 | Jobe | F16J 15/061<br>83/13 |
| 2018/0337377 | A1 * | 11/2018 | Stephens | H01M 50/224 |
| 2022/0154825 | A1 * | 5/2022 | Kaiser-Krug | H01M 50/262 |
| 2025/0206152 | A1 * | 6/2025 | Zhu | B60L 50/64 |

* cited by examiner

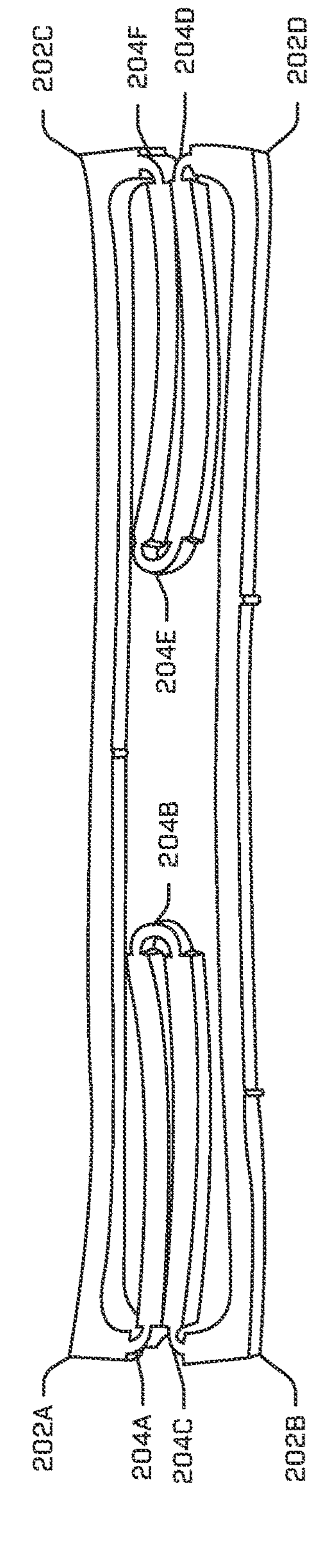
FIG. 2A
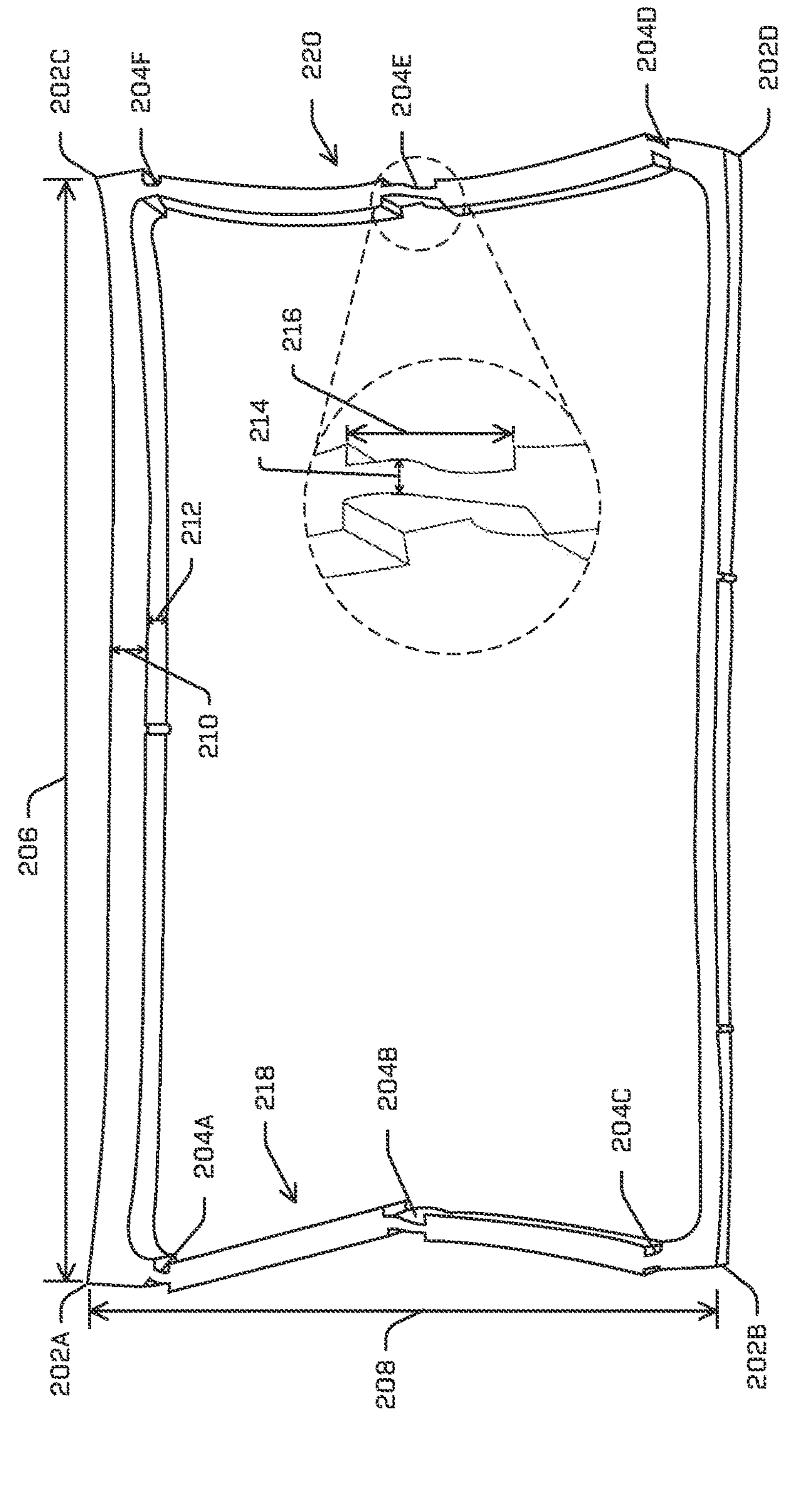
FIG. 2B
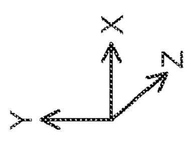

UNITARY SEAL COMPRISING ATTENUATED PORTIONS FOR HIGH MATERIAL UTILIZATION

BACKGROUND

Seals are often disposed between various components and parts within a vehicle to prevent ingress of dust, moisture, etc. For example, seals may be disposed between and/or around doors, storage compartments, access panels, control panels, etc. In the traditional manufacturing process, seals are cut from a sheet of material into the desired shape intended for installation. However, cutting a unitary seal of a larger size can generate a considerable amount of wasted material. In some cases, larger seals may be cut into multiple pieces and assembled using adhesives prior to installation. However, seals assembled from multiple discrete pieces in this manner may not provide sufficient ingress protection and may be prone to failure.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 2A is a perspective view of an example seal in a folded configuration.

FIG. 2B is a perspective view of the example seal of FIG. 2A in an unfolded configuration.

Figure 1:
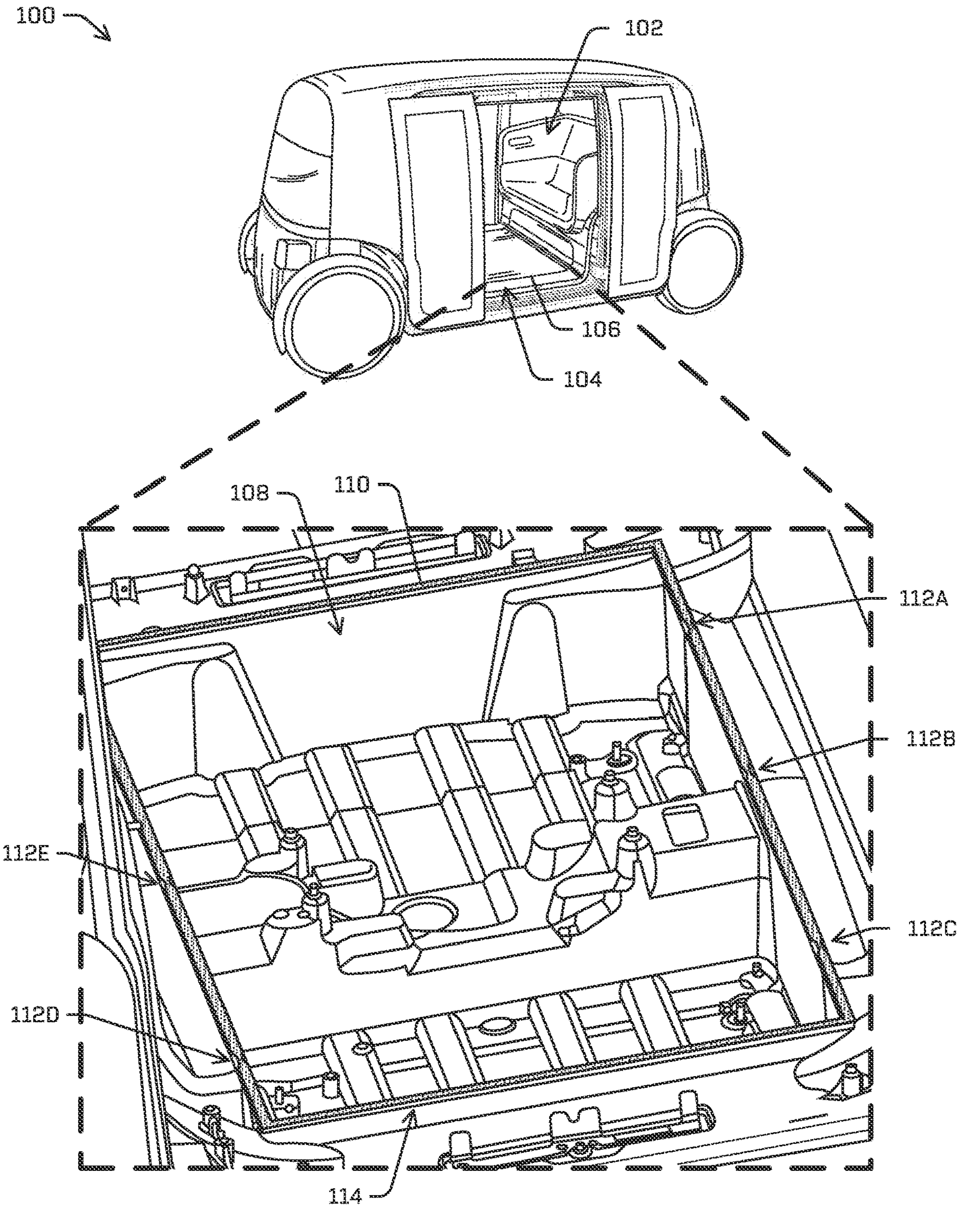
FIG. 1 depicts a perspective view of an example vehicle including a seal comprising attenuated portions in the excerpted view, in accordance with an example of the present disclosure.

The drawings are exemplary in nature and may, for example, not show various components in proportion to one another and/or may not be drawn to scale.

DETAILED DESCRIPTION

As mentioned above, conventional seals are cut into the desired (or final) shape intended for installation during the manufacturing process. However, cutting seals in this manner can lead to a considerable amount of wasted material the manufacturer cannot use. In some cases, over 97% of material is scrapped and the effective utilization ratio (EUR) of the material is less than 3%. This process substantially inflates the cost of manufacturing unitary seals (i.e., seals that comprise a continuous loop of material with an opening in the middle), especially when manufactured to enclose larger areas (e.g., seals that enclose an area of about 0.75 $m^2$ or more). For example, a seal having a length of about 1.2 meters, a width of about 0.7 meters, and a thickness of about 12 mm may create about 0.84 $m^2$ of wasted material or more. Throughout this disclosure, the thickness of a seal refers to the distance between opposite sides (e.g., inside and outside) of the seal. The seal also has a height, which is a distance between a first sealing surface and a second sealing surface opposite the first sealing surface in an uncompressed state. The sealing surfaces are the surfaces of the seal that come in contact with one or more other surfaces or components to create a tight and secure barrier. For instance, the seal may be interposed between a first component (e.g., a lid) and a second component (e.g., a receptacle) with a first sealing surface of the seal contacting the first component and a second sealing surface of the seal contacting the second component to provide a seal between the first component and the second component.

To mitigate issues of waste, one approach has been to form the seals from multiple pieces and combining the multiple pieces (e.g., using adhesives) prior to installation. This approach, however, does not ensure sufficient protection against the ingress of water and other contaminants and can lead to inconsistent results or diminished effectiveness over time at least because of interfaces between seals that may be difficult to design while maintaining sealing properties. Seals created in this manner may not perform as reliably and may not be as durable when installed in areas of a vehicle associated with frequent movement, vibrations, opening/closing, etc. Additionally, components of a vehicle enclosed in areas that require easy or frequent access prevent the use of silicone or other sealers, which are intended to provide a permanent (non-removable) seal rather than allowing for easy access.

This application relates to a unitary seal comprising a plurality of attenuated portions. An attenuated portion may be a thinned region of the seal that provides flexibility and acts as a joint within the seal. For example, the seal may be configured to bend or pivot along the attenuated portion without tearing or buckling. One or more unitary seals comprising a plurality of attenuated portions may be cut (e.g., using die cutting techniques, waterjet cutting, laser cutting, etc.) in a folded configuration from a sheet of material. After the seal is cut, the attenuated portions enable the seal to be unfolded into its final shape prior to installation. Cutting a unitary seal in a folded configuration with a plurality of attenuated portions allows for more effective utilization of material. In at least one example, cutting one or more seals from a sheet of material increases the EUR of the sheet of material from less than 3% to over 70%. Higher material utilization leads to cost savings and decreased waste which has environmental benefits and improves sustainability. In some examples, the seals with attenuated portions may also improve the performance of the seal by allowing for greater flexibility of certain portions of the seal during installation, without compromising the stability and sealing performance of the seal.

In some examples, the seal may be disposed around one or more components of a vehicle. For examples, a vehicle may comprise a compartment (e.g., passenger compartment) having a floor. A receptacle may be disposed in the floor of the compartment and a cover may be coupled to and enclose the receptacle. The cover may have a mating surface surrounding a perimeter of the cover configured to contact a sealing surface of the seal. That is, a unitary seal may be disposed between the mating surface of the cover and a perimeter of the receptacle (or a mating surface of a second component) such that a certain percentage or level of compression is achieved between the cover and the perimeter of the receptacle.

While this application describes and depicts a seal disposed within a floor of the vehicle, the seal described in this application can be disposed between various other components positioned anywhere within the vehicle. Additionally, while this application describes examples in which the seal is applied to a vehicle, this application is not limited to vehicles. The seal described in this application can be applied to other vehicle types including, but not limited to airplanes, trains, boats, tractors, or any other devices, equipment, or machines.

In some examples, a length of the unitary seal measured along its longest axis may range from between about 1 meter to about 1.5 meters and a width of the unitary seal measured along its widest axis may range from between about 0.5 meters to about 0.99 meters. In some examples, a length of the seal measured along its longest axis is at least about 1 meter, a width of the seal measured along its widest axis is at least about 0.5 meters, and a height of the seal is at least about 5 mm. In at least one example, a length of the seal measured along its longest axis is about 1.2 meters, a width of the seal measured along its widest axis is about 0.7 meters, and a height of the seal is about 6 mm. However, these are merely examples, and seals according to this application may have lengths, widths, and/or heights that are larger and/or smaller than the examples given herein. In some examples, a seal may comprise at least one attenuated portion. Seals according to the techniques described herein which have over a majority of their length a nominal thickness of at least about 10 mm or more and comprising attenuated portions (e.g., having a thickness less than the nominal thickness, in some examples less than half of the nominal thickness) make installation of the seal easier than conventional seals that are made entirely of the nominal thickness (without any attenuated portions) and also easier than thinner conventional seals (e.g., having a thickness of less about 5 mm). Conventional seals made entirely of the nominal thickness are unable to articulate sufficiently to bend around corners and/or result in large amounts of wasted material. Meanwhile conventional thinner conventional seals twist, bend, and/or buckle on themselves during shipping and installation. That is, seals according to the techniques described herein which have over a majority of their length a nominal thickness and comprising attenuated portions allow for a stiff enough seal for assembly while the attenuated portions provide more flexibility to unfold and/or bend around corners to assist with proper alignment of the seal onto a centerline of a mating surface of a component (e.g., in cases where the attenuated portions are narrower than a width of a mating flange of a component).

In some examples, the seal may comprise at least one corner (e.g., a point or edge where two surfaces or sides of the seal meet at an angle) in order to provide more stability during installation. Though the example seals illustrated in the figures are rectangular in shape, other seal shapes having attenuated portions are contemplated (e.g., rectangular with rounded corners, hexagonal, trapezoidal, circular, etc.). In some examples, no more than about 35% of the seal may comprise of attenuated portions (i.e., a total surface area of attenuated portions relative to a total surface area of the seal), regardless of the number of attenuated portions. That is, a bulk of the seal must have a sufficient width and thickness in order to provide stability and compressibility. This is to prevent the seal from folding, crumpling, or otherwise failing when being applied and/or compressed.

A shape (e.g., cross sectional shape and/or top-down shape), length, and/or thickness of individual attenuated portions may vary throughout the seal. For example, the attenuated portions may vary in thickness across a length of the attenuated portion (e.g., from at least about 2.5 mm to at most 5 mm). In some examples, an attenuated portion may have a minimum thickness equal to about one third the thickness of a non-attenuated portion of the seal. In some instances, attenuated portions may be spaced at least about 30 mm from individual corners of the seal to improve stability during unfolding of the seal and installation and/or during compression of the seal (e.g., between a cover and a receptacle). In some examples, a first side of an attenuated portion has a first profile or shape and a second side opposite the first side has a second profile or shape different than the first profile. Additional details and example implementations are provided below with reference to the figures.

FIG. 1 depicts a perspective view of an example vehicle 100 including a seal 110 comprising attenuated portions 112A, 112B, and 112C in the excerpted view (a fourth attenuated portion is disposed on the seal opposite the first attenuated portion 112A and is not shown in FIG. 1). The excerpted view also depicts the seal coupled to a perimeter 114 of a receptacle 108 that is disposed in the floor 104 of a passenger compartment of the vehicle 100.

The vehicle 100 includes two wheels/tires positioned at each longitudinal end of the vehicle 100. The vehicle 100 may include doors positioned proximate the center of the length of the vehicle. In some examples, the vehicle 100 can represent a bi-directional autonomous vehicle. The vehicle 100 may include a compartment 102 having a floor 104. A compartment 102 may be a separate, enclosed space within a structure of the vehicle 100. For example, a compartment may be used for storage (e.g., trunk, center console, glove compartment, etc.) and/or seating (e.g., a passenger compartment). In at least one example, a compartment may comprise a passenger compartment including a floor 104.

A receptacle 108 may be disposed in the floor 104 of the passenger compartment. A receptacle may be a container or designated space configured to hold and/or store components, objects, electronics, fluids, etc. In some examples, a receptacle may house mechanical components and/or electrical components of a vehicle. For example, the receptacle may house computing device(s), batter(ies), sensor(s), and the like. The receptacle 108 includes a perimeter 114 that is configured to adhere or couple to the seal 110. In some examples, a mating surface of the perimeter of the receptable may be at between about 6 mm wide to about 15 mm wide. In some examples, a thickness of a seal (i.e., the non-attenuated portions of a seal) may be equal to between about 10 mm to about 15 mm. In some examples, attenuated portions of the seal may have a thickness equal to between about 2.5 mm to at about 5 mm.

A cover 106 may be coupled to and enclose the receptacle 108. The cover 106 may be configured to prevent water, dust, debris, etc. from entering the receptacle 108. In examples, the cover 106 may comprise the same or similar material as the floor 104 of the vehicle 100 in order to maintain a seamless appearance. For example, a cover may comprise of wood, aluminum, steel, rubber, vinyl, carpet, composite materials (glass fiber-reinforced plastics (GRP), carbon fiber, etc.) or a combination thereof.

A seal 110 may be disposed between the cover 106 and the receptacle 108. The seal 110 may comprise a flexible, durable, and/or water-resistant material. For example, the seal may comprise a foam material (e.g., polyurethane open-cell foam material, closed-cell foam material, polyvinyl chloride (PVC) foam, etc.), rubber, synthetic rubber, neoprene, ethylene propylene diene monomer material, etc. When coupled to the cover and a perimeter of the receptacle, the seal may be configured to resist or minimize the ingress of water, dust, debris, etc. from entering a receptacle. The seal may also be configured to insulate the receptacle or compartment by preventing heat or cold from escaping or entering the receptacle, dampen sound by sealing gaps and openings, absorb and/or dampen vibrations transmitted through the vehicle structure, and provide structural reinforcement by sealing gaps or joints.

In some examples, the seal 110 may have a density equal to between about 16 kg/m$^3$ (or 1 lb./ft$^3$) to about 80 kg/m$^3$ (or 5 lbs./ft$^3$). In at least one example, the seal 110 may have a density of at most 32 kg/m$^3$ (or 2 lbs./ft$^3$). In some examples, the seal 110 may be configured to compress to a certain percentage of its original height to achieve a proper barrier (or seal) while maintaining functionality. For example, the seal may be configured to compress between about 20% and 30% of its original height when under pressure (e.g., equal to between about 7 kPa to about 35 kPa (or 1 psi to about 5 psi)).

In some examples, the seal may have an ingress protection (IP) rating of at least IPX5. In some examples, the seal may have an IP rating of at least IPX6, or at least IPX7. In some examples, the seal may have an IP rating of at least IP53 (i.e., the seal protects from and limited dust ingress and protects from watery spray less than 60 degrees from vertical). The IP rating of the seal may be based at least in part on the fastening mechanisms (e.g., bolts, screws, clips, etc.) coupling the cover to the receptable, dimensions of the mating surfaces, and/or the seal. In at least one example, twenty-two M8-1.25×20 mm hex head bolts are utilized to couple the cover to the receptable and/or floor. In some examples, the bolts may be equally or unequally spaced (e.g., about 280 mm apart along a length of the cover and about 140 mm apart along the width of the cover). In some examples, bolts may be disposed along a perimeter as well as a middle of the cover. In some examples, the bolts may be torqued to about 15 Newton meters (Nm)±2 Nm. In some examples, the roughness average (RA), or the average deviation of surface peaks and valleys from the mean line of a surface profile of a bolt may be about 3.0 μm (e.g., the surface of the bolts may have some irregularities and roughness).

The seal may comprise a first sealing surface and a second sealing surface opposite the first sealing surface. In examples, the sealing surfaces may be substantially flat in order to enable the creation of a barrier and prevent water, debris, etc. from entering and/or exiting the receptacle and potentially damaging components within the receptacle. A first sealing surface of the seal may be configured to contact a perimeter of a receptacle (or a first component or substrate). A second sealing surface of the seal opposite the first sealing surface may be configured to contact the cover (or a second component or substrate). In some examples, one or both of the sealing surfaces may have an adhesive applied to all or a portion thereof. In some examples, the adhesive may be a pressure-sensitive adhesive (PSA) configured to form a bond when pressure is applied to the seal, an acrylic adhesive, a silicone adhesive, polyurethane adhesive, etc. In some examples the adhesive may be releasable with or without by application of heat, solvent, or other removal agents, and without damaging the seal such that the seal can be reused multiple times after removing and replacing the cover.

The seal may comprise a plurality of attenuated portions (e.g., first attenuated portion 112A, second attenuated portion 112B, and third attenuated portion 112C). An attenuated portion may be a thinned region of the seal that provides flexibility and may behave as a joint within the seal. For example, the seal may be configured to bend or pivot along the attenuated portion without tearing. The attenuated portions can enable one or more unitary seals to be cut from a piece of material in a folded configuration. After the seal is cut in the folded configuration, the attenuated portions enable the seal to be unfolded prior to installation. Cutting a seal in a folded configuration with a plurality of attenuated portions maximizes material utilization. For example, a plurality of seals may be cut from a single sheet of material (e.g., foam) which minimizes waste. Further description of example seals is discussed below. Though only three attenuated portions are illustrated in FIG. 1, a seal may comprise any number of attenuated portions.

Though FIG. 1 illustrates a single seal being disposed within the passenger compartment of the vehicle 100, the seal or other similar seals may additionally or alternatively be disposed in other areas within a vehicle and/or the vehicle may include multiple seals. For example, a seal(s) may be disposed along a perimeter of a door(s), seat(s), around the perimeter of a sunroof opening, along glazing and/or trim, or any other portions or components of the vehicle that may be frequently moved or accessed.

FIG. 2A is a perspective view of an example seal 200A in folded configuration. The seal 200A may include four corners (i.e., first corner 202A, second corner 202B, third corner 202C, and fourth corner 202D) and six attenuated portions (i.e., first attenuated portion 204A, second attenuated portion 204B, third attenuated portion 204C, fourth attenuated portion 204D, fifth attenuated portion 204E, and sixth attenuated portion 204F). The corners of a seal provide stability and define a general shape of the seal. In at least one example, one or more corners of the seal may comprise an attenuated portion(s). In some examples, the attenuated portions may be spaced a distance from a corner of the seal. In at least one example, an attenuated portion may be spaced at least about 30 mm from a corner of a seal in order to improve a stability of the seal during installation. In some examples, attenuated portions may be positioned at least about 30 mm apart from another attenuated portion on the seal.

In at least one example, the unitary seal may comprise four corners, a first side 218 having a first set of attenuated portions (e.g., three attenuated portions including a first attenuated portion 204A, second attenuated portion 204B, and third attenuated portion 204C), and a second side 220 opposite the first side having a second set of attenuated portions (e.g., three attenuated portions including a fourth attenuated portion 204D, fifth attenuated portion 204E, and sixth attenuated portion 204F). Having a side comprising three attenuated portions enables the seal to transition between a folded configuration and an unfolded configuration. That is, having three attenuated portions on two separate sides of a seal (i.e., opposite sides) enables the seal to be cut or formed while in a folded configuration (which dramatically reduces the amount of wasted material) and unfolded prior to install to match the shape of the sealing surface. The folded configuration also enables the seal to be shipped while maintaining its shape without becoming twisted, bent, tangled or buckled as a conventional, thin seal is prone to do during shipping and handling.

The attenuated portions may vary in shape, thickness, and/or length. For example, a first number of the attenuated portions may comprise a first shape, thickness, and/or length while a second number of the attenuated portions of a seal may comprise a second shape, thickness, and/or length different than the first shape, thickness, and/or length. In some examples, the shape, width, and/or length of the attenuated portion may depend on the location of the attenuated portion on the seal.

FIG. 2B is a perspective view of the example seal of FIG. 2A in an unfolded configuration 200B. The depicted seal has a body that has a rectangular or square shape having four corners, although other seal shapes are contemplated. In some examples, the body of the seal may have a length 206 (e.g., the dimension of the seal measured along its longest axis from one end to the other) of between about 1 meter to about 1.4 meters and a width 208 (e.g., the dimension of the seal measured across its widest part in a direction perpendicular to the length) may be between about 0.5 meters to about 0.99 meters. In some examples, a thickness 210 (i.e., the distance between opposite sides of a sealing surface of the seal) of the non-attenuated portions of the seal may be at least about 5 mm. In some examples, a thickness of the non-attenuated portions may be equal to between about 10 mm to about 15 mm. A thickness of an attenuated portion of the seal may be from at least about 2.5 mm to at most 5 mm. In some examples, a height 212 of the seal (or depth of the seal) may be generally uniform (or substantially uniform) throughout the seal in order to ensure consistency in sealing performance. In some examples, a height of the seal may be between about 5 mm to about 7 mm.

In some examples, a thickness 214 of the attenuated portions of the seal may be based at least in part on the thickness 210 of the non-attenuated portions of the seal. For example, an attenuated portion may have a minimum thickness equal to about one third the thickness of a non-attenuated portion of the seal. For example, if a thickness of a non-attenuated portion is about 12 mm, the thickness of an attenuated portion is a minimum of about 4 mm (in some examples, a thickness of an attenuated portion may vary along the length of the attenuated portion). In some examples, depending on the placement and/or number of total attenuated portions disposed on a seal, an attenuated portion may have a minimum thickness equal to about one half the thickness of a non-attenuated portion of the seal (e.g., in cases where a seal comprises seven or more attenuated portions). In some examples, the ratio between an attenuated portion of the seal and a non-attenuated portion of the seal is lower than about a 1 to 2.8 ratio. For instance, if the seal is about 10 mm thick (i.e., the non-attenuated portion of the seal), an attenuated portion may have a minimum thickness of about 3.6 mm. In another example, a 1 to 2 ratio may include a seal that is 10 mm thick (i.e., the non-attenuated portion of the seal) and the attenuated portion having a minimum thickness of about 5 mm. In some examples, a minimum thickness of an attenuated portion may be based at least in part on the material of seal. For example, an attenuated portion of a seal comprising a polyurethane open-cell foam material may have a minimum thickness of about 3.5 mm.

In some examples, a minimum thickness of an attenuated portion may be based at least in part on shape of the attenuated portion. For example, a first attenuated portion having a linear shape when the seal is in an unfolded configuration may have a minimum thickness of at least about 2.5 mm while a second attenuated portion having a wavy shape (or non-linear shape) when the seal is in an unfolded configuration may have a minimum thickness of at least about 3 mm. In some examples, a minimum thickness of an attenuated portion may be based at least in part on the position of the attenuated portion on the seal (e.g., relative to a corner of the seal or another attenuated portion positioned on the seal). For example, a first attenuated portion (e.g., first attenuated portion 204A) that is proximate a corner of a seal (e.g., corner 202A) may have a lower minimum thickness relative to a second attenuated portion (e.g., second attenuated portion 204B) positioned further away from a corner of a seal, or vice versa in the case where stability during the unfolding and installation of the seal is increased.

In some examples, a thickness 214 of an attenuated portion may be consistent throughout a length 216 of the attenuated portion. In alternative examples, a thickness of an attenuated portion may vary throughout the length of the attenuated portion (e.g., an attenuated portion may have a toothed shape, such as the attenuated portion illustrated in FIG. 7G). In some examples, an attenuated portion may comprise an hourglass shape having a tapered middle portion and ends that wider relative to a middle portion. Additional profiles of attenuated portions are described below in relation to FIGS. 7A-7G.

A seal may comprise a plurality of attenuated portions having similar or different lengths. In some examples, a length 216 of an attenuated portion may range between about 10 mm to about 60 mm. In at least one example, an attenuated portion may have a maximum length of about 50 mm. In some examples, a length 216 of an attenuated portion may depend at least in part on a distance of the attenuated portion from a corner of a seal and/or other attenuated portions. For example, an attenuated portion closer to a corner of a seal (e.g., first attenuated portion 204A) may have a shorter length relative to an attenuated portion positioned further away from the corner (e.g., second attenuated portion 204B). In some examples, a length of an attenuated portion may depend on the seals folded configuration. For example, as shown in FIG. 2A, while in the folded configuration, the first attenuated portion 204A is configured to bend about 90 degrees while the second attenuated portion 204B may be configured to bend about 180 degrees and therefore is associated with a longer length relative to the first attenuated portion 204A.

Figure 3A:
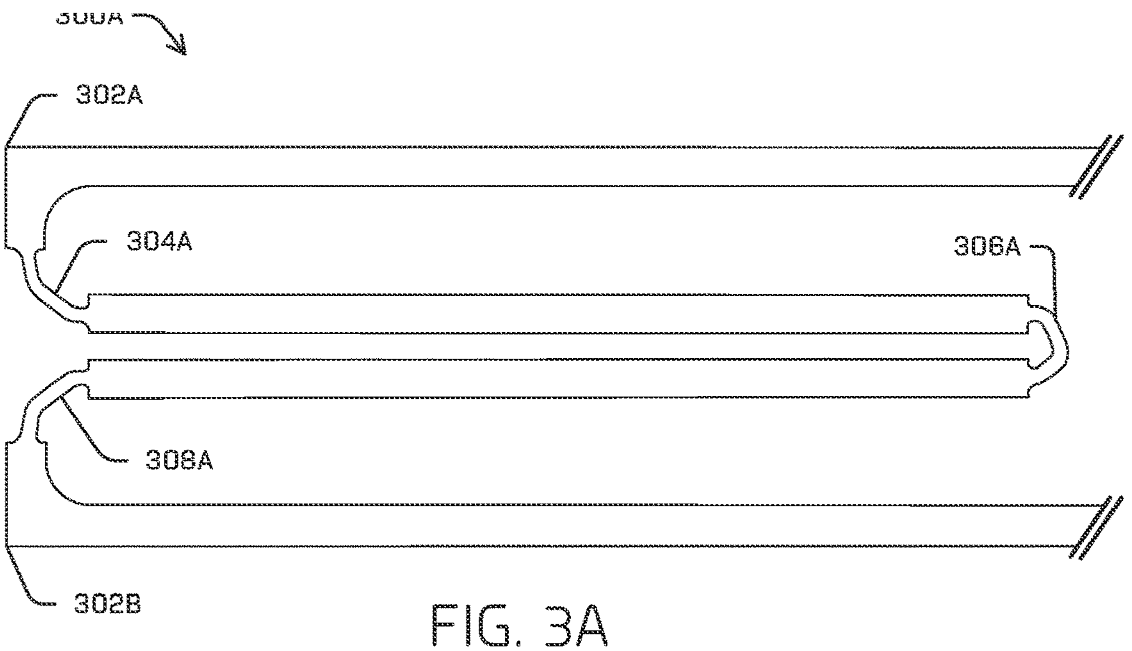
FIG. 3A is a top view of a portion of a seal comprising three attenuated portions in a folded configuration.
Figure 3B:
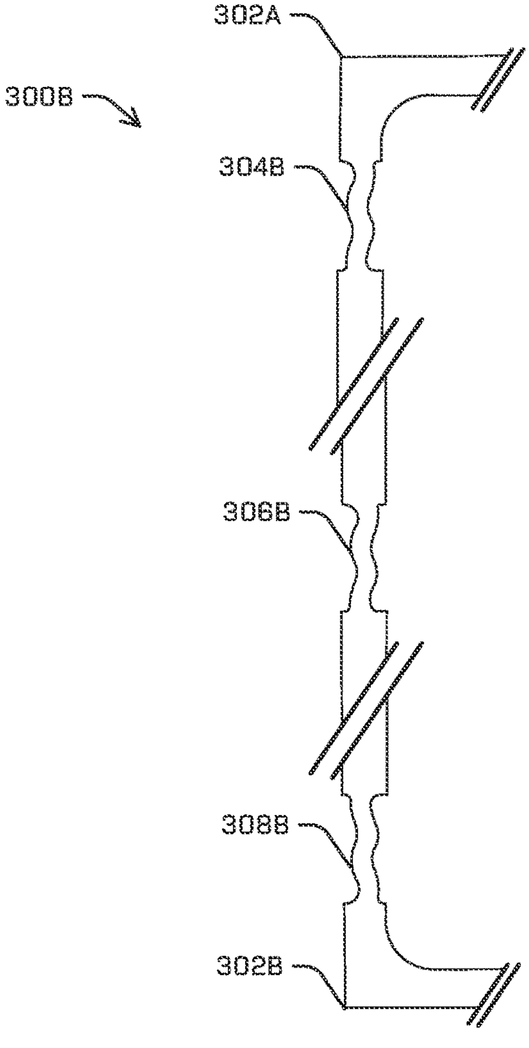
FIG. 3B is a top view of the seal of FIG. 3A comprising three attenuated portions in an unfolded configuration.

FIG. 3A is a top view of a portion of a seal (i.e., a left half of a seal) comprising three attenuated portions (i.e., first attenuated portion 304A, second attenuated portion 306A, and third attenuated portion 308A) in a folded configuration 300A. The portion of the seal illustrated comprises a first corner 302A and a second corner 302B. FIG. 3B is a top view of the seal of FIG. 3A illustrating the three attenuated portions (i.e., first attenuated portion 304B, second attenuated portion 306B, and third attenuated portion 308B) in an unfolded configuration 300B. FIGS. 3A and 3B illustrate that attenuated portions may appear differently when the seal is folded and unfolded. That is, the attenuated portions may appear to have a first shape when the seal is in a folded configuration and a second shape when the seal is unfolded after cutting.

Figure 4:
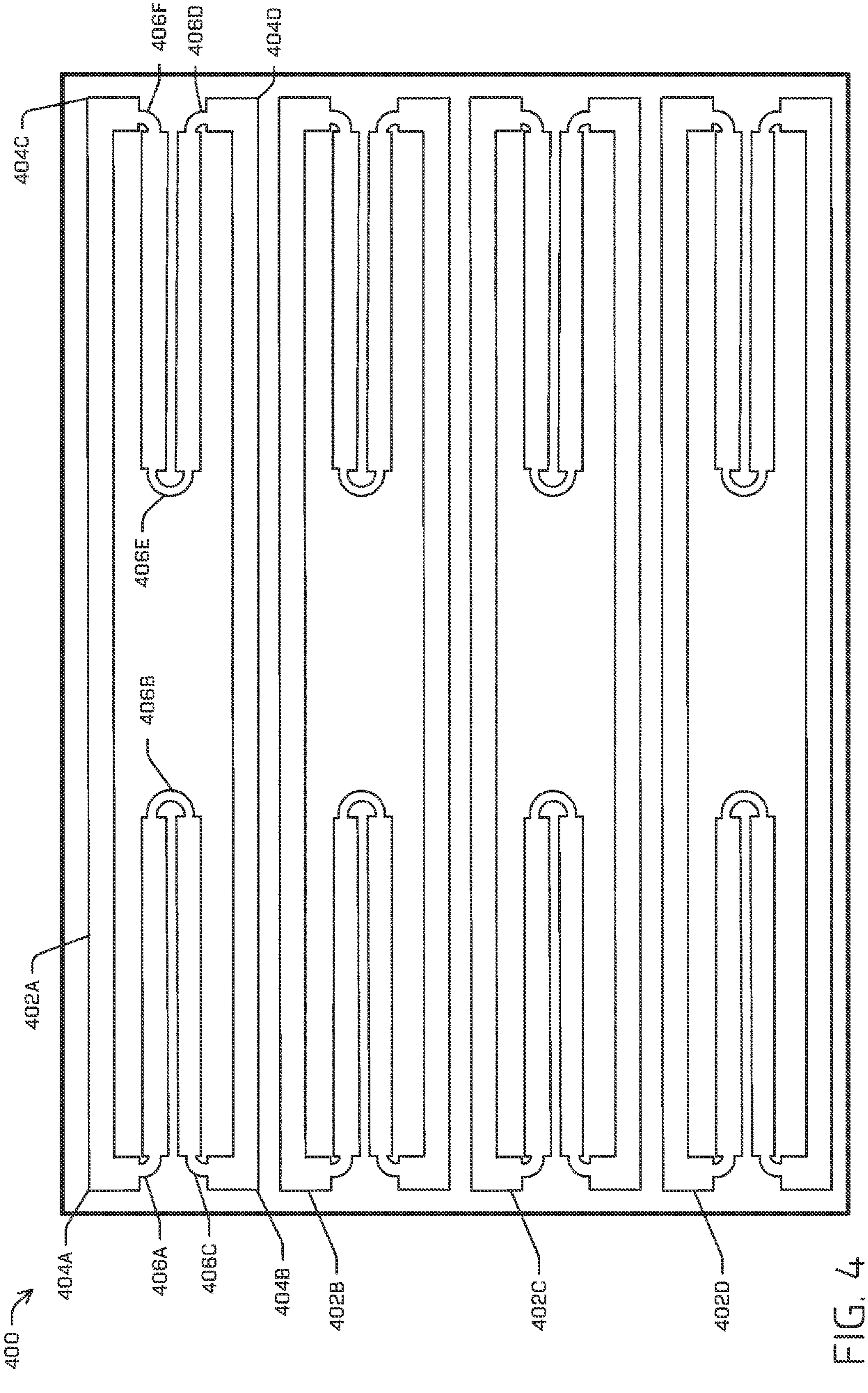
FIG. 4 is a top view of a sheet of material comprising a plurality of seals in a folded configuration.

FIG. 4 is a top view of a sheet of material 400 comprising a plurality of seals (i.e., first seal 402A, second seal 402B, third seal 402C, and fourth seal 402D) in a folded configuration. Though four seals are illustrated in FIG. 4, any number of unitary seals may be cut from a single piece of material. In some examples, the sheet of material may comprise a sheet of foam (e.g., a polyurethane open-cell foam material, closed-cell foam material, polyvinyl chloride (PVC) foam, etc.), rubber, synthetic rubber, neoprene, ethylene propylene diene monomer material, and the like. FIG. 4 illustrates four seals having a uniform design while in a folded configuration; however, it is contemplated that seals having different designs or configurations may be cut from a single sheet of material. As discussed above, in some examples, a seal may comprise four corners (e.g., first corner 404A, second corner 404B, third corner 404C, and fourth corner 404D) and six attenuated portions (e.g., first attenuated portion 406A, second attenuated portion 406B, third attenuated portion 406C, fourth attenuated portion 406D, fifth attenuated portion 406E, and sixth attenuated portion 406F).

Figure 5:
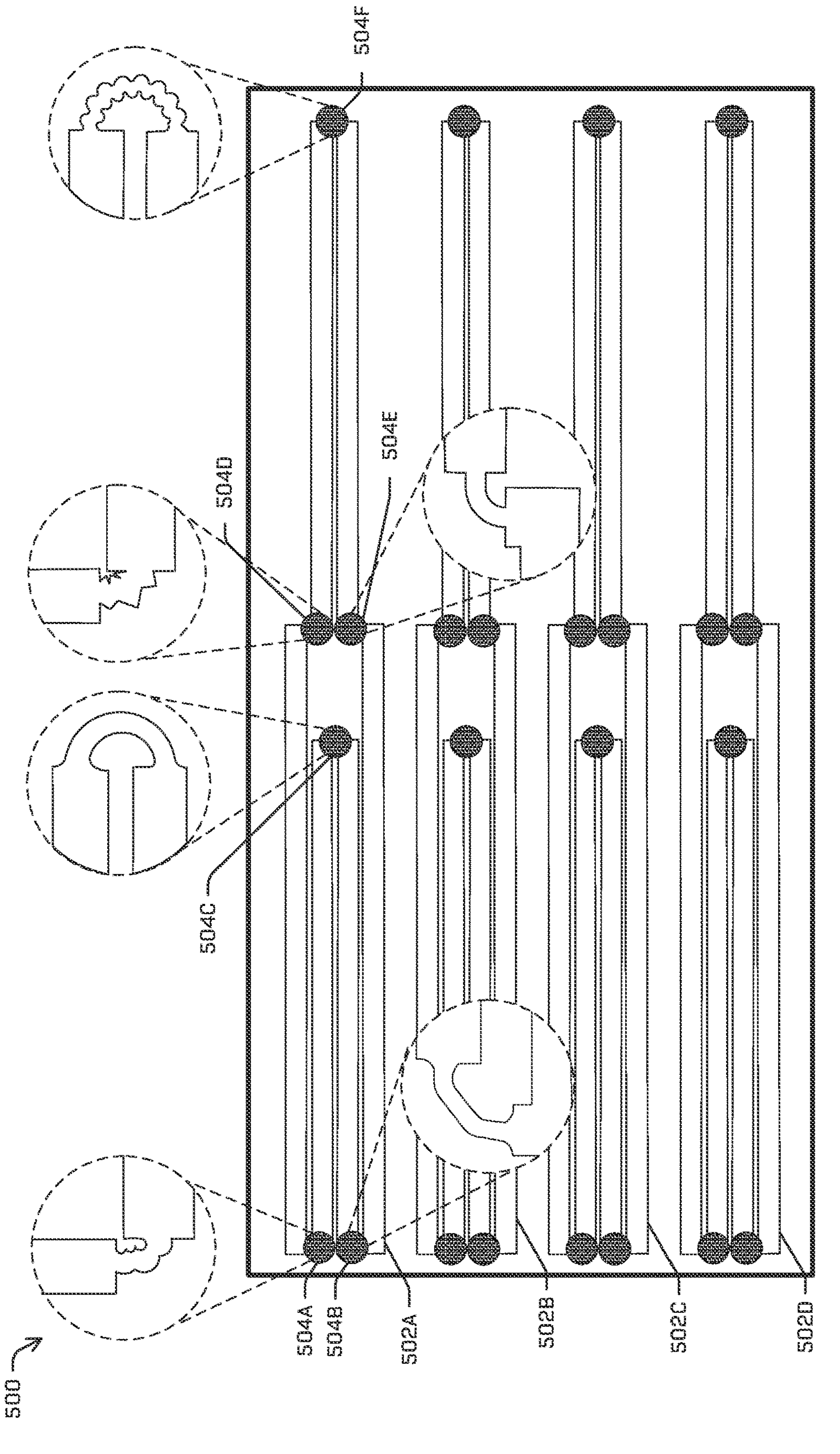
FIG. 5 is top view of another sheet of material comprising a plurality of seals in an alternative folded configuration. The excerpted views illustrate example attenuated portions of a seal.

FIG. 5 is top view of another sheet of material 500 comprising a plurality of seals (e.g., a first seal 502A, a second seal 502B, a third seal 502C, and a fourth seal 502D) in an alternative folded configuration. The excerpted views illustrate example attenuated portions of a seal (e.g., first attenuated portion 504A, second attenuated portion 504B, third attenuated portion 504C, fourth attenuated portion 504D, fifth attenuated portion 504E, and sixth attenuated portion 504F) having various shapes, profiles, lengths, and thicknesses.

Figure 6:
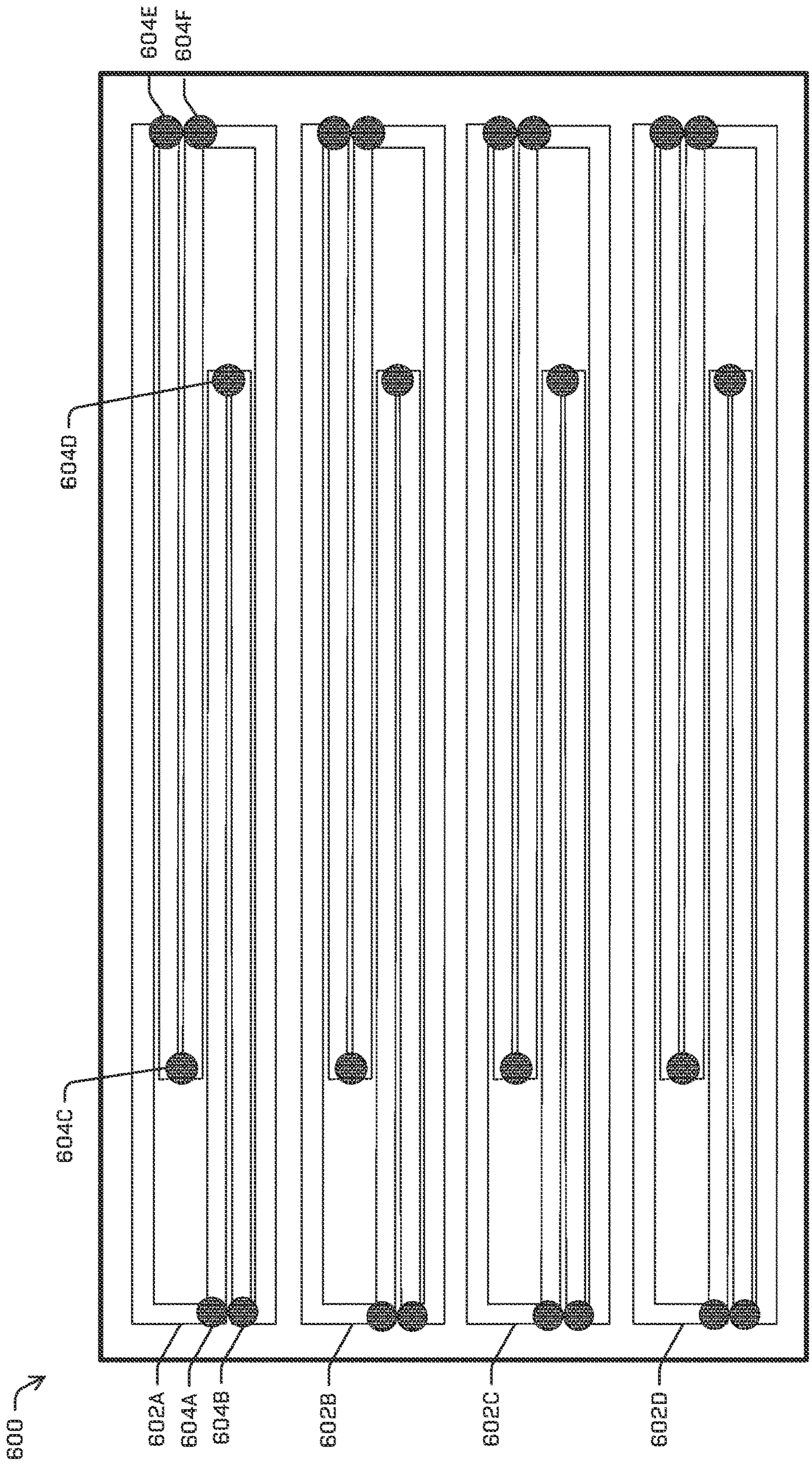
FIG. 6 is a top view of another sheet of material comprising a plurality of seals in an alternative folded configuration.

FIG. 6 is a top view of another sheet of material 600 comprising a plurality of seals (e.g., a first seal 602A, a second seal 602B, a third seal 602C, and a fourth seal 602D) in another alternative folded configuration. The individual seals comprise six attenuated portions positioned at various positions on the seals (e.g., first attenuated portion 604A, second attenuated portion 604B, third attenuated portion 604C, fourth attenuated portion 604D, fifth attenuated portion 604E, and sixth attenuated portion 604F).

Figures 7A, 7B, 7C, 7D:
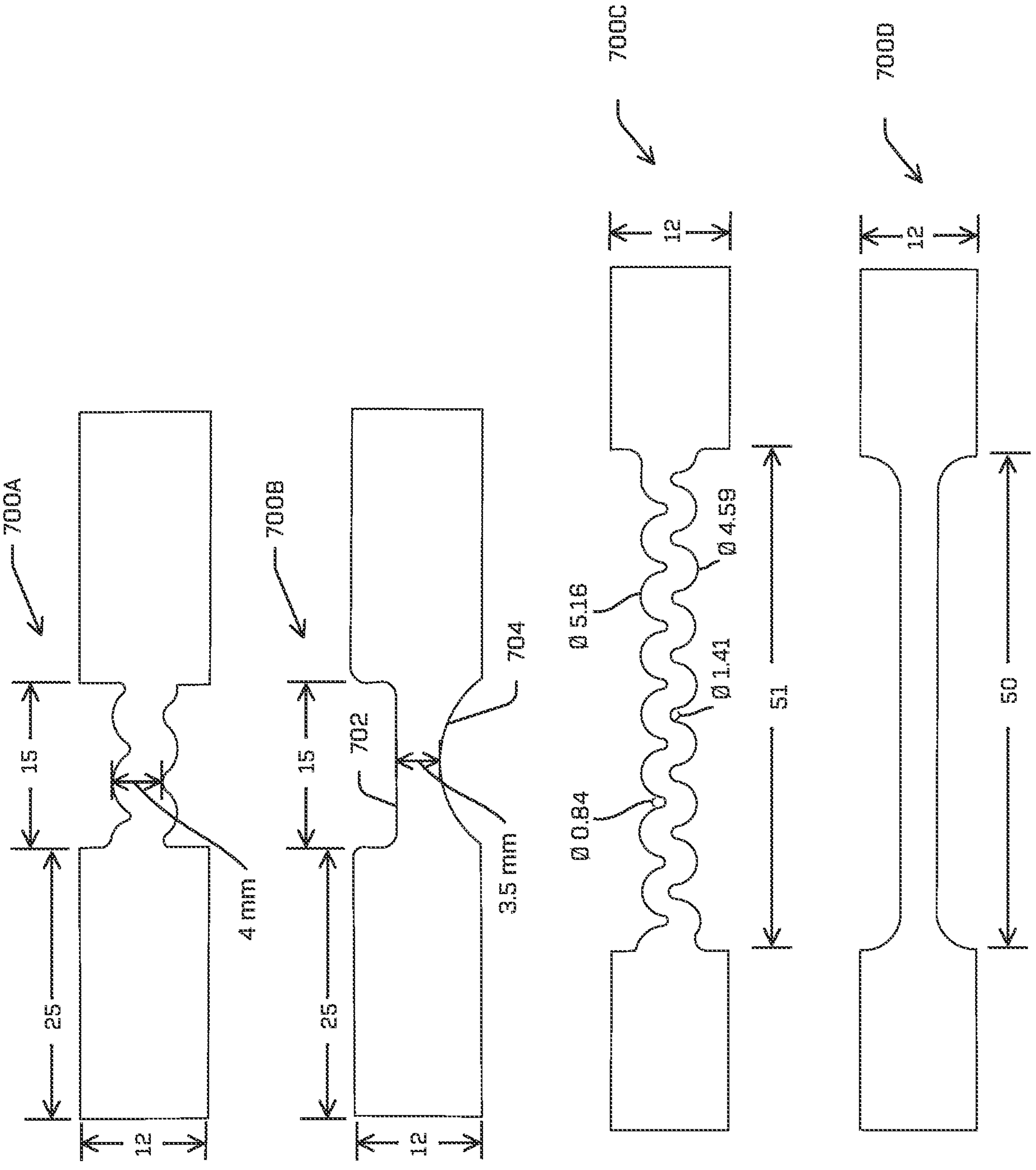
FIGS. 7A-7G illustrate a top view of example attenuated portions of a seal.

FIGS. 7A-7G illustrate a top view of example attenuated portions of a seal in an unfolded configuration. FIG. 7A illustrates a top view of an attenuated portion 700A having a wavy profile. In some examples, the attenuated portion may have a length equal to between about 12 mm to about 20 mm. In some examples, the attenuated portion may have a thickness equal to between about 3.5 mm to 4.5 mm. In at least one example, the attenuated portion 700A may have a length of about 15 mm, and a thickness of about 4 mm. A thickness of a non-attenuated portion of the seal may be about 12 mm. FIG. 7B illustrates a first side 702 of an attenuated portion 700B having a first profile (e.g., a linear profile) and a second side 704 opposite the first having a second profile different than the first profile (e.g., a concave profile). In some examples, the profile of a side of an attenuated portion may be based at least in part on the folded and unfolded configuration of the seal.

FIG. 7C illustrates an attenuated portion 700C have a wavy profile (or non-linear profile) and a length of 51 mm as well as example radii of the wavy profile. A wavy profile may comprise a series of repeating sinusoidal waves, each wave crest and trough having its own radius of curvature. The radius of curvature is the radius of a circle that best fits the curvature of the wave at a particular point. The radii illustrated in FIG. 7C are merely examples and the radii may differ from what is illustrated in FIG. 7C, as well as the other figures throughout the disclosure.

FIG. 7D illustrates an attenuated portion 700D having a linear profile when in an unfolded configuration. In the particular example illustrated in FIG. 7D, the attenuated portion 700D has a length of 50 mm. In some instances, a length of the attenuated portion may be equal to between about 30 mm to about 60 mm and a thickness of the attenuated portion 700D may be equal to between about 3 mm to about 4.5 mm.

Figure 7E:
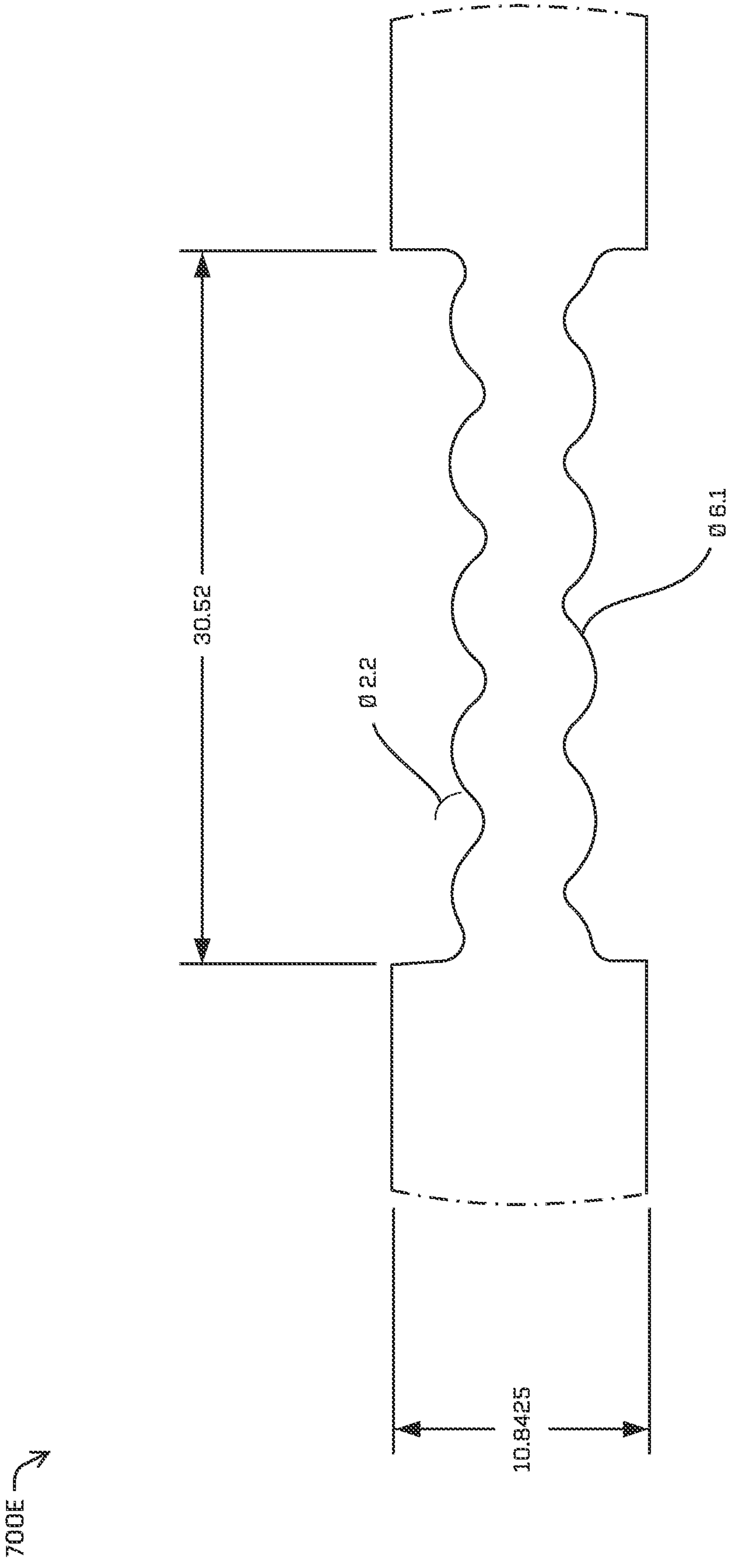

FIG. 7E illustrates an attenuated portion 700E having a different wavy profile and a length of about 31 mm. In the particular example, a thickness of a non-attenuated portion of the seal is about 11 mm. In some examples, the attenuated portion 700E may have a length equal to between about 20 mm to about 40 mm and a thickness equal to between about 3 mm to about 4.5 mm.

Figure 7F:
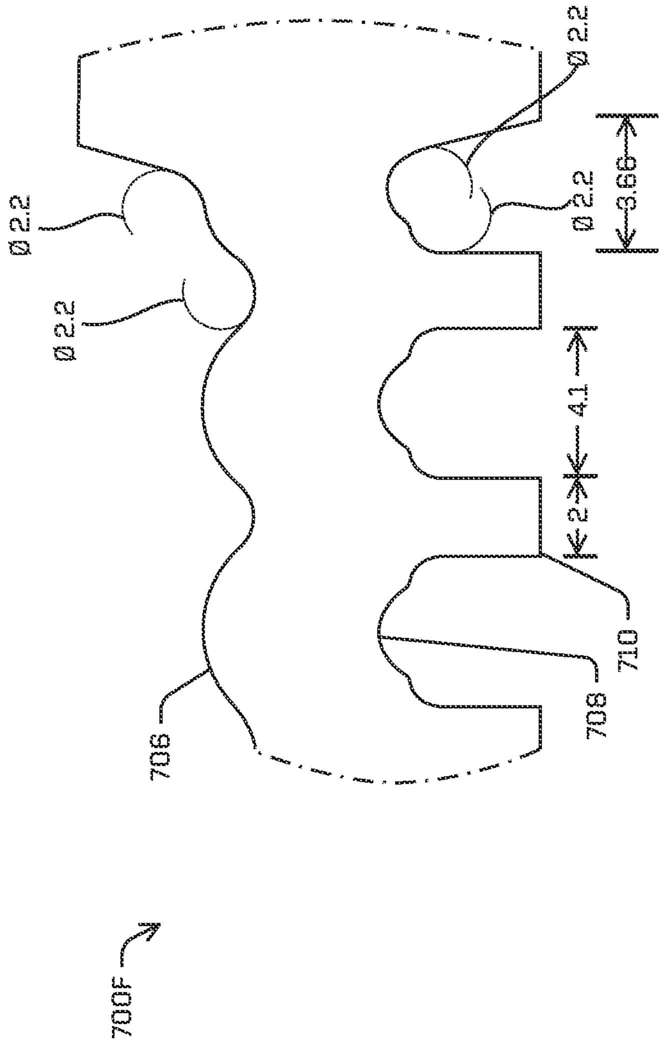

FIG. 7F illustrates an attenuated portion 700F having sides associated with two different profiles. That is, a first side 706 of the attenuated portion 700F has a first profile (e.g., wavey profile) and a second side 708 opposite the first side has a second profile different than the first profile (e.g., arched profile). In some examples, sections of an attenuated portion may extend to an edge of the seal. For example, as illustrated in FIG. 7F, a section 710 of the second side 708 of the attenuated portion 700F extends to an edge of the seal. In some examples, attenuated portions having sections that extend to an edge of a seal may assist with proper placement of the seal during installation (e.g., sections extending to an edge of the seal may function as guides).

Figure 7G:
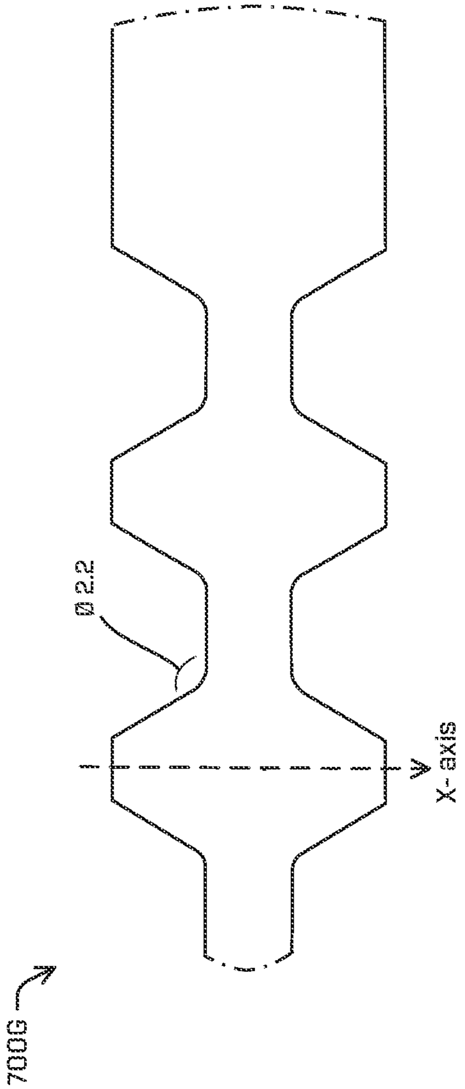

FIG. 7G illustrates an attenuated portion 700G have a toothed profile. In some examples, the teeth on opposite sides of the attenuated portion may align with each other along a single axis (e.g., x-axis), as shown in FIG. 7G. In alternative examples, the teeth may be staggered. For example, the teeth on opposite sides of the attenuated portion may be arranged in an alternating or offset pattern such that the teeth do not directly align with each other along a single axis. In some examples, one or both sides of the attenuated portion 700G may include one or more sections (e.g., a tooth) that extend to an edge of the seal.

Figure 8:
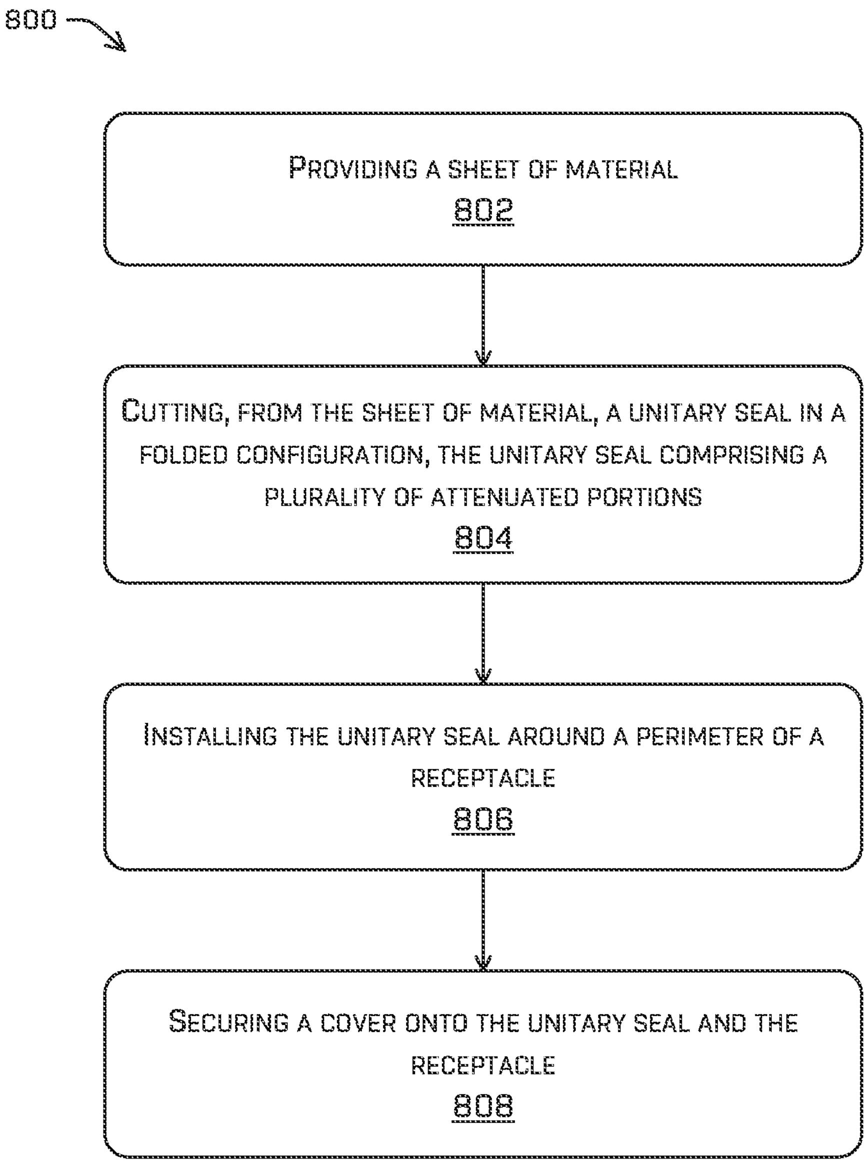
FIG. 8 is a flowchart depicting an example process for cutting a unitary seal in a folded configuration, in accordance with an example of the present disclosure.

FIG. 8 is a flowchart illustrating an example process 800 for cutting a unitary seal in a folded configuration, in accordance with an example of the present disclosure.

At operation 802, the process may include providing a sheet of material. A sheet of material may comprise a sheet of foam (e.g., polyurethane open-cell foam, a closed-cell foam material, polyvinyl chloride (PVC) foam), rubber, synthetic rubber, neoprene, ethylene propylene diene monomer material, and the like. In some examples, the sheet of material may have a length of between about 1.2 meters and 1.5 meters and a width of about 0.5 meters to about 1.1 meters.

At operation 804, the process may include cutting, from the sheet of material, one or more unitary seals in a folded configuration. The unitary seal may comprise a plurality of attenuated portions that enable the seal to be unfolded after it is cut and prior to installation. As discussed above, cutting the unitary seal in the folded configuration increases an effective utilization ratio associated with the sheet of material. That is, multiple seals may be cut from a single sheet of material in a folded configuration and unfolded prior to install. Due to their much more compact size in the folded configuration, the multiple seals can be laid out compactly and close together on the single sheet of material, thereby minimizing the wasted material of the sheet. The seal may be cut using a variety of techniques including, but not limited to, die cutting (e.g., steel rule die cutting method, rotary die cutting, etc.), waterjet cutting (e.g., using a high-pressure stream of water mixed with an abrasive substance to cut through a sheet of material), laser cutting, hot wire cutting, and the like.

At operation 806, the process may include installing the unitary seal around a perimeter of a receptacle. That is, the unitary seal may be unfolded and positioned such that a sealing surface of the unitary seal contacts a perimeter of a receptacle (or a first component). Pressure may be applied along the length of the seal to ensure proper adhesion to the component surface.

At operation 808, the process may include securing a cover (or a second component) onto the unitary seal and receptacle such that a level of compression is achieved between the cover and the perimeter of the receptacle. For example, the cover may be secured to a floor and/or receptacle of a vehicle using fasteners, bolts, screws, clips, etc. to ensure proper compression between the cover, seal, and perimeter of the receptable. The level of compression may be based at least in part on the material of the seal, the material of the cover (or first component), material of the second component (e.g., perimeter of the receptacle), fastening method and/or type of fastener(s) utilized, and/or a desired IPX rating (e.g., IPX5, IPX6, IP53, etc.).

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the examples and applications illustrated and described, and without departing from the spirit and scope of the claims.

EXAMPLE CLAUSES

The following paragraphs describe various examples. Any of the examples in this section may be used with any other of the examples in this section and/or any of the other examples or embodiments described herein.

A: A vehicle comprising: a compartment having a floor; a receptacle disposed in the floor of the compartment; a cover coupled to and enclosing the receptacle, the cover having a mating surface surrounding a perimeter of the cover; a seal disposed between the mating surface of the cover and a perimeter of the receptacle, the seal comprising: at least one corner; and a plurality of attenuated portions spaced a distance from the at least one corner, the plurality of attenuated portions configured to enable the seal to transition between a folded configuration and an unfolded configuration.

B. The vehicle of paragraph A, wherein individual attenuated portions of the plurality of attenuated portions have a minimum thickness equal to about one third a thickness of a non-attenuated portion of the seal.

C. The vehicle of paragraphs A or B, wherein a length of the seal measured along its longest axis is equal to between about 1 meter to about 1.5 meters, a width of the seal measured along its widest axis is equal to between about 0.5 meters to about 0.99 meters, and a height of the seal is equal to between about 5 mm to about 7 mm.

D. The vehicle of any one of paragraphs A-C, wherein the seal further comprises: a side comprising at least three attenuated portions, the three attenuated portions enabling the seal to transition between the folded configuration and the unfolded configuration.

E. The vehicle of any one of paragraphs A-D, wherein at least one attenuated portion of the plurality of attenuated portions comprises a first side having a first profile and a second side opposite the first side having a second profile different than the first profile.

F. The vehicle of any one of paragraphs A-E, wherein the seal comprises a foam material, rubber, neoprene, or ethylene propylene diene monomer material.

G. The vehicle of any one of paragraphs A-F, wherein individual attenuated portions of the plurality of attenuated portions have a thickness of from at least about 2.5 mm to at most 5 mm.

H. The vehicle of any one of paragraphs A-G, wherein the seal has an ingress protection (IP) rating of at least IPX5.

I. The vehicle of any one of paragraphs A-H, wherein individual attenuated portions of the plurality of attenuated portions have a maximum length of about 50 mm.

J. A unitary seal comprising: a continuous loop of material comprising an opening in a middle of the unitary seal; and a plurality of attenuated portions configured to fold and enable the unitary seal to transition between a folded configuration and an unfolded configuration.

K. The unitary seal of paragraph J, further comprising: a first side comprising a first set of attenuated portions; and a second side opposite the first side, the second side comprising a second set of attenuated portions.

L. The unitary seal of any one of paragraphs J or K, wherein individual attenuated portions of the plurality of attenuated portions have a length equal to about 12 mm to about 60 mm.

M. The unitary seal of any one of paragraphs J-L, wherein a length of the unitary seal measured along its longest axis is at least about 1 meter and a width of the unitary seal measured along its widest axis is at least about 0.5 meters.

N. The unitary seal of any one of paragraphs J-M, further comprising: at least one corner, and wherein individual attenuated portions of the plurality of attenuated portions are spaced at least about 30 mm away from the at least one corner.

O: The unitary seal of any one of paragraphs J-N, wherein individual attenuated portions of the plurality of attenuated portions have a minimum thickness equal to about one half a thickness of a non-attenuated portion of the unitary seal.

P: The unitary seal of any one of paragraphs J-O, wherein at least one attenuated portion of the plurality of attenuated portions comprises a first side having a first profile and a second side opposite the first side having a second profile different than the first profile.

Q: A method comprising: providing a sheet of material; and cutting, from the sheet of material, a unitary seal in a folded configuration, wherein the unitary seal comprises: a continuous loop of material comprising an opening in a middle of the unitary seal; and a plurality of attenuated portions configured to enable the unitary seal to transition between a folded configuration and an unfolded configuration.

R. The method of paragraph Q, wherein an effective utilization ratio associated with the sheet of material is at least about 60%.

S. The method of paragraphs Q or R, wherein the unitary seal is a first unitary seal and the plurality of attenuated portions are a first plurality of attenuated portions, the method further comprising: cutting, from the sheet of material, a second unitary seal in a folded configuration wherein the second unitary seal comprises a second plurality of attenuated portions.

T. The method of any one of paragraphs Q-S, further comprising: installing the unitary seal around a perimeter of a first component of a vehicle; and securing a cover onto the unitary seal and the first component such that a level of compression is achieved between the cover and the perimeter of the first component.

While the example clauses described above are described with respect to particular implementations, it should be understood that, in the context of this document, the content of the example clauses can also be implemented via a method, device, system, computer-readable medium, and/or another implementation. Additionally, any of examples A-T may be implemented alone or in combination with any other one or more of the examples A-T.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While features, components, and operations may be presented in a certain arrangement, configuration, and/or order, the arrangement, configuration, and/or order may be rearranged, combined, or omitted without changing the function of the systems and methods described. Additionally, various computations that are herein need not be performed in the order disclosed, and other examples using alternative orderings of the computations could be readily implemented.

What is claimed is:

1. A vehicle comprising:

a compartment having a floor;

a receptacle disposed in the floor of the compartment;

a cover coupled to and enclosing the receptacle, the cover having a mating surface surrounding a first perimeter of the cover; and a unitary seal disposed between the mating surface of the cover and a second perimeter of the receptacle, the unitary seal comprising:

a continuous loop of a single material comprising a substantially rectangular shape and an opening in a middle of the unitary seal, wherein the continuous loop has a length, a width, a height, and a plurality of thicknesses;

a first corner;

a first plurality of attenuated portions spaced a distance from the first corner, the first plurality of attenuated portions configured to enable the unitary seal to transition between a folded configuration and an unfolded configuration; wherein:

the first plurality of attenuated portions are associated with a first edge parallel with a width direction of the substantially rectangular shape;

the single material has a first thickness of the plurality of thicknesses at the first plurality of attenuated portions of the unitary seal and a second thickness of the plurality of thicknesses at a non-attenuated portion of the unitary seal; and the first corner comprises a point where the first edge parallel with the width direction and a second edge parallel with a length direction of the substantially rectangular shape meet at a polygonal angle; and a second plurality of attenuated portions associated with a third edge parallel with the width direction and opposite the first edge, the third edge meeting the second edge at a second corner opposite the first corner along the length direction, wherein the second edge, the first corner, and the second corner are non-attenuated.

2. The vehicle of claim 1, wherein the first thickness at individual attenuated portions of the first plurality of attenuated portions has a minimum thickness equal to about one third the second thickness of the non-attenuated portion of the unitary seal.

3. The vehicle of claim 1, wherein:

the length of the unitary seal is measured along its longest axis and is equal to between about 1 meter to about 1.5 meters, the width of the unitary seal is measured along its widest axis and is equal to between about 0.5 meters to about 0.99 meters, and the height of the unitary seal is equal to between about 5 mm to about 7 mm.

4. The vehicle of claim 1, wherein the unitary seal further comprises:

a side associated with the first edge and comprising at least three attenuated portions of the first plurality of attenuated portions, the at least three attenuated portions enabling the unitary seal to transition between the folded configuration and the unfolded configuration.

5. The vehicle of claim 1, wherein at least one attenuated portion of the first plurality of attenuated portions comprises a first side having a first profile and a second side opposite the first side having a second profile different than the first profile.

6. The vehicle of claim 1, wherein the unitary seal comprises a foam material, rubber, neoprene, or ethylene propylene diene monomer material.

7. The vehicle of claim 1, wherein individual attenuated portions of the first plurality of attenuated portions have a thickness of from at least about 2.5 mm to at most 5 mm.

8. The vehicle of claim 4, wherein a first attenuated portion and a third attenuated portion of the at least three attenuated portions are configured to bend about 90 degrees in the folded configuration and a second attenuated portion of the at least three attenuated portions is configured to bend about 180 degrees, the second attenuated portion being between the first attenuated portion and the third attenuated portion.

9. A unitary seal comprising:

a continuous loop of a single material comprising a substantially rectangular shape and an opening in a middle of the unitary seal;

a first plurality of attenuated portions configured to fold and enable the unitary seal to transition between a folded configuration and an unfolded configuration; wherein;

the first plurality of attenuated portions are associated with a first edge parallel with a width direction of the substantially rectangular shape; and the single material has a first thickness at the first plurality of attenuated portions of the unitary seal and a second thickness at a plurality of non-attenuated portions of the unitary seal;

a first corner, the first corner comprising a point where the first edge parallel with the width direction and a second edge parallel with a length direction of the substantially rectangular shape meet at a polygonal angle; and a second plurality of attenuated portions associated with a third edge parallel with the width direction and opposite the first edge, the third edge meeting the second edge at a second corner opposite the first corner along the length direction, wherein the second edge, the first corner, and the second corner are non-attenuated.

10. The unitary seal of claim 9, wherein individual attenuated portions of the first plurality of attenuated portions have a length equal to about 12 mm to about 60 mm.

11. The unitary seal of claim 9, wherein a length of the unitary seal measured along its longest axis is at least about 1 meter and a width of the unitary seal measured along its widest axis is at least about 0.5 meters.

12. The unitary seal of claim 9, further comprising:

at least one corner, wherein individual attenuated portions of the first plurality of attenuated portions are spaced at least about 30 mm away from the at least one corner.

13. The unitary seal of claim 9, wherein individual attenuated portions of the first plurality of attenuated portions have a minimum thickness equal to about one half a thickness of a non-attenuated portion of the unitary seal.

14. The unitary seal of claim 9, wherein at least one attenuated portion of the first plurality of attenuated portions comprises a first side having a first profile and a second side opposite the first side having a second profile different than the first profile.

15. The unitary seal of claim 9, wherein the single material comprises a monolithic material.

16. The unitary seal of claim 9, wherein the first thickness is based in part on at least one of positions of the first plurality of attenuated portions, the second thickness, shapes of the first plurality of attenuated portions, a count of the first plurality of attenuated portions, bend angles of the first plurality of attenuated portions in the folded configuration of the unitary seal, and the single material.

17. The unitary seal of claim 9, wherein the first plurality of attenuated portions divide the first edge into portions associated with the second thickness; and the portions associated with the second thickness are parallel to the length direction in the folded configuration due to bending of the first plurality of attenuated portions in the folded configuration.

18. The unitary seal of claim 9, wherein a majority of the unitary seal comprises the plurality of non-attenuated portions having the second thickness.

19. A vehicle comprising:

a unitary seal comprising:

a continuous loop of a single material comprising a substantially rectangular shape and an opening in a middle of the unitary seal, wherein the continuous loop has a length, a width, a height, and a plurality of thicknesses;

a first plurality of attenuated portions configured to fold and enable the unitary seal to transition between a folded configuration and an unfolded configuration; wherein:

the first plurality of attenuated portions are associated with a first edge parallel with a width direction of the substantially rectangular shape; and the unitary seal has a first thickness of the plurality of thicknesses at the first plurality of attenuated portions of the unitary seal and a second thickness of the plurality of thicknesses at a plurality of non-attenuated portions of the unitary seal, the first thickness being thinner than the second thickness;

a first corner, the first corner comprising a point where the first edge parallel with the width direction and a second edge parallel with a length direction of the substantially rectangular shape meet at a polygonal angle; and a second plurality of attenuated portions associated with a third edge parallel with the width direction and opposite the first edge, the third edge meeting the second edge at a second corner opposite the first corner along the length direction, wherein the second edge, the first corner, and the second corner are non-attenuated.

20. The vehicle of claim 19, wherein:

the first plurality of attenuated portions comprise thinned regions of the unitary seal.

* * * * *